(12) United States Patent
Zhang et al.

(10) Patent No.: US 10,313,275 B2
(45) Date of Patent: Jun. 4, 2019

(54) PACKET FORWARDING

(71) Applicant: New H3C Technologies Co., Ltd., Hangzhou, Zhejiang (CN)

(72) Inventors: Yang Zhang, Beijing (CN); Ling Kuang, Beijing (CN); Minghui Wang, Beijing (CN); Hongyuan Zhang, Beijing (CN); Hai Hu, Beijing (CN); Guangliang Wen, Beijing (CN)

(73) Assignee: New H3C Technologies Co., Ltd., Hangzhou (CN)

( * ) Notice: Subject to any disclaimer, the term of this patent is extended or adjusted under 35 U.S.C. 154(b) by 0 days.

(21) Appl. No.: 15/567,887

(22) PCT Filed: May 4, 2016

(86) PCT No.: PCT/CN2016/080932
§ 371 (c)(1),
(2) Date: Oct. 19, 2017

(87) PCT Pub. No.: WO2016/177314
PCT Pub. Date: Nov. 10, 2016

(65) Prior Publication Data
US 2018/0091446 A1    Mar. 29, 2018

(30) Foreign Application Priority Data

May 4, 2015    (CN) .......................... 2015 1 0220901

(51) Int. Cl.
*H04L 12/46*    (2006.01)
*H04L 12/931*    (2013.01)
(Continued)

(52) U.S. Cl.
CPC ............ *H04L 49/70* (2013.01); *H04L 12/413* (2013.01); *H04L 12/4633* (2013.01);
(Continued)

(58) Field of Classification Search
CPC ..................................................... H04L 12/46
See application file for complete search history.

(56) References Cited

U.S. PATENT DOCUMENTS 8,923,155 B2    12/2014 Qu et al.
8,934,501 B2    1/2015 Ramesh
(Continued)

FOREIGN PATENT DOCUMENTS

CN    103095546      5/2013
CN    103200069 A    7/2013
(Continued)

OTHER PUBLICATIONS

European Patent Office, Extended European Search Report Issued in Application No. 16789314.8, dated Jan. 25, 2018, Germany, 11 pages.
(Continued)

*Primary Examiner* — Brandon M Renner
(74) *Attorney, Agent, or Firm* — McCoy Russell LLP

(57) ABSTRACT

I/O board of a VXLAN switch removes VXLAN encapsulation from a packet, determines to perform layer 3 forwarding for the packet and sends the packet to a fabric board of the VXLAN switch. The fabric board determines to perform layer 3 forwarding for the packet, searches out a layer 3 entry matching a destination IP address of the packet from a local layer 3 table, modifies a source MAC address of the packet into a gateway MAC address of the VXLAN switch, modifies a destination MAC address of the packet into a destination MAC address in the layer 3 entry, and when an egress port in the layer 3 entry is a VLAN port, sends the packet to an I/O board associated with the egress port. The I/O board associated with the egress port forwards the packet to a VLAN via the egress port in the layer 3 entry.

8 Claims, 4 Drawing Sheets

(51) Int. Cl.
*H04L 12/947* (2013.01)
*H04L 12/413* (2006.01)
*H04L 12/741* (2013.01)
*H04L 29/12* (2006.01)
*H04L 12/721* (2013.01)
*H04L 12/66* (2006.01)
*H04L 29/08* (2006.01)

(52) U.S. Cl.
CPC .......... *H04L 12/4641* (2013.01); *H04L 45/74* (2013.01); *H04L 49/25* (2013.01); *H04L 61/2007* (2013.01); *H04L 12/66* (2013.01); *H04L 45/66* (2013.01); *H04L 61/6022* (2013.01); *H04L 69/325* (2013.01)

(56) References Cited

U.S. PATENT DOCUMENTS

| | | | |
|---|---|---|---|
| 2013/0124750 A1 | 5/2013 | Anumala et al. | |
| 2014/0146817 A1 | 5/2014 | Zhang | |
| 2015/0009992 A1* | 1/2015 | Zhang | H04L 49/354 370/392 |
| 2015/0063353 A1 | 3/2015 | Kapadia et al. | |
| 2015/0358232 A1* | 12/2015 | Chen | H04L 45/72 370/392 |

FOREIGN PATENT DOCUMENTS

| | | |
|---|---|---|
| CN | 104158718 | 11/2014 |
| CN | 104350714 A | 2/2015 |
| CN | 104378300 A | 2/2015 |
| JP | 2015039135 A | 2/2015 |
| WO | 2014028094 A1 | 2/2014 |
| WO | 2014032620 A1 | 3/2014 |
| WO | 2015000329 A1 | 1/2015 |

OTHER PUBLICATIONS

European Patent Office, Extended European Search Report Issued in Application No. 16789315.5, dated Feb. 1, 2018, Germany, 9 pages.
European Patent Office, Extended European Search Report Issued in Application No. 16789308.0, dated Feb. 5, 2018, Germany, 11 pages.
International Search Report issued by ISA/CN for PCT/CN2016/080932 (dated Jul. 22, 2016).
United States Patent and Trademark Office, Office Action Issued in U.S. Appl. No. 15/567,747, dated Sep. 7, 2018, 16 pages.
United States Patent and Trademark Office, Office Action Issued in U.S. Appl. No. 15/568,252, dated Sep. 10, 2018, 18 pages.
Japanese Patent Office, Office Action Issued in Application No. 2018509961, dated Sep. 11, 2018, 9 pages.
State Intellectual Property Office of the People's Republic of China, Office Action and Search Report Issued in Application No. 201510220901.6, dated Dec. 5, 2018, 9 pages.
State Intellectual Property Office of the People's Republic of China, Office Action and Search Report Issued in Application No. 201510222676.X, dated Dec. 11, 2018, 8 pages.
European Patent Office, Office Action Issued in Application No. 16789314.8, dated Dec. 17, 2018, Germany, 5 pages.
State Intellectual Property Office of the People's Republic of China, Office Action and Search Report Issued in Application No. 201510222700.X, dated Dec. 27, 2018, 12 pages.
Japanese Patent Office, Office Action Issued in Application No. 2018-509961, dated Apr. 16, 2019, 7 pages. (Submitted with Partial English Translation).

* cited by examiner

PACKET FORWARDING

BACKGROUND

Virtual eXtensible Local Area Network (VXLAN) is a layer 2 Virtual Private Network (VPN) technology based on an Internet Protocol (IP) network and adopting "Media Access Control (MAC) in User Data Protocol (UDP)" encapsulation. The VXLAN may implement layer 2 interconnection among distributed physical sites based on service providers or enterprise IP networks, and may provide service isolation for different tenants. The VXLAN may be applied to a data center network.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

A frame-type switch includes a main board, an Input/Output (110) board and a fabric board. The main board is a single board for implementing calculation of a protocol stack, distribution and control of a forwarding entry and device management. The I/O board is a single board for implementing forwarding of data packets, for example, internal forwarding and external forwarding of data packets. The fabric board is a single board for forwarding a data packet and a control packet between boards and between chips inside a device. A chip on the fabric board has a packet forwarding function and may forward packets between different I/O boards.

Similar to the structure of the frame-type switch, a VXLAN switch includes a main board, an I/O board and a fabric board. In an example, the number of I/O boards is larger than 1.

In a VXLAN application, the fabric board of the VXLAN switch is set as the fabric board of the frame-type switch. A chip on the fabric board of the VXLAN switch has a packet forwarding function and may forward packets between different I/O boards.

In some examples of the present disclosure, a VXLAN switch may be selected as a gateway. The VXLAN switch selected as the gateway is called a gateway VXLAN switch and may be improved.

The gateway VXLAN switch may be improved as follows.

The fabric board of the gateway VXLAN switch uses a chip with a forwarding function and various entry functions. The entry functions include a function of receiving and saving an entry distributed by the main board, an entry searching function and so on. For example, the chip used by the fabric board may be a switch chip used by the I/O hoard of the gateway VXLAN switch.

When the fabric hoard of the gateway VXLAN switch uses the chip with the forwarding function and the entry functions, layer 3 forwarding of a packet entering the gateway VXLAN switch may be implemented via the cooperation of the I/O board and the fabric board of the gateway VXLAN switch. A method for forwarding a packet from a VXLAN to a Virtual Local Area Network (VLAN) will be described hereinafter with reference to some examples and FIG. 1.

Figure 1:
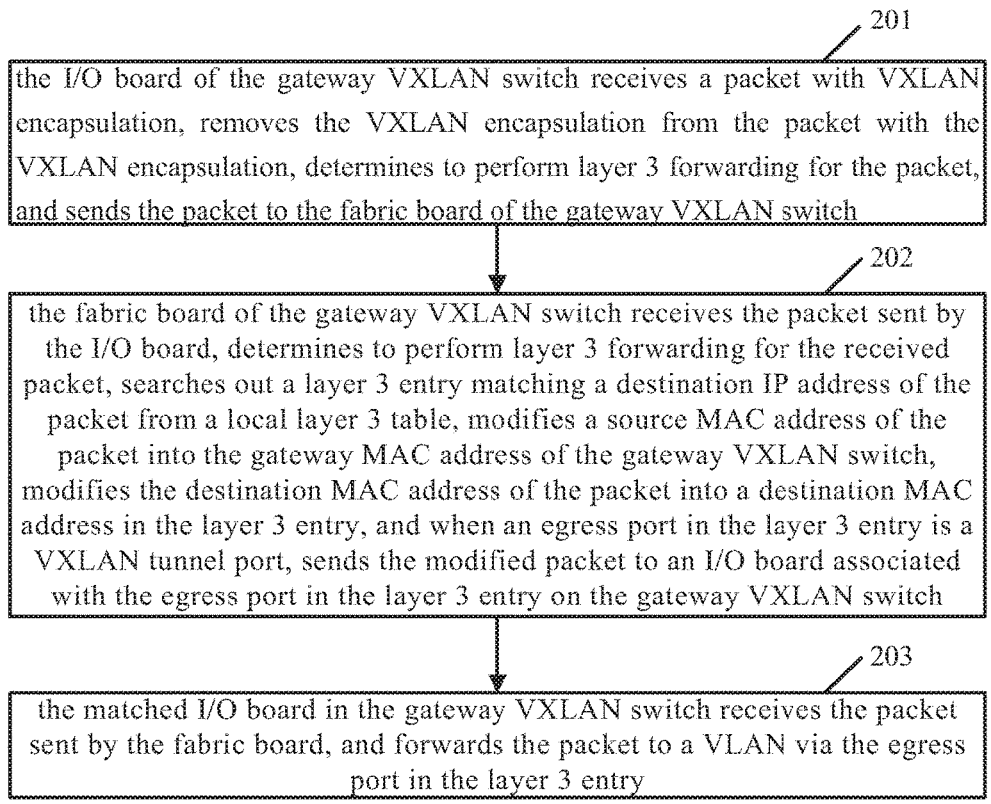
FIG. 1 is a flowchart illustrating a method for forwarding a packet from a VXLAN to a VLAN according to some examples of the present disclosure.

FIG. 1 is a flowchart illustrating a method for forwarding a packet from a VXLAN to a VLAN according to some examples of the present disclosure. The method may be applied to a gateway VXLAN switch. The fabric board of the gateway VXLAN switch uses a chip with a forwarding function and various entry functions. For example, the chip used by the fabric board may be the same as that used by the I/O board of the gateway VXLAN switch. Accordingly, as shown in FIG. 1, the method includes following blocks 201 to 203.

At block 201, the I/O board of the gateway VXLAN switch receives a packet with VXLAN encapsulation, removes the VXLAN encapsulation from the packet with the VXLAN encapsulation, determines to perform layer 3 forwarding for the packet, and sends the packet to the fabric board of the gateway VXLAN switch.

In an example of block 201, before the I/O board of the gateway VXLAN switch removes the VXLAN encapsulation from the packet with the VXLAN encapsulation, the method further includes: identifying a Virtual Network ID (VNID) from a VXLAN encapsulation header of the packet.

In an example of block 201, the I/O board of the gateway VXLAN switch may determine to perform layer 3 forwarding for the packet according to the identified VNID. A method for determining to perform layer 3 forwarding for the packet according to the identified VNID by the I/O board of the gateway VXLAN switch is implemented as follows.

The I/O board of the gateway VXLAN switch searches a local MAC table for a MAC entry matching the VNID and a destination MAC address of the packet. If the MAC entry is searched out and the destination MAC address of the packet is a gateway MAC address of the gateway VXLAN switch, the I/O board of the gateway VXLAN switch determines to perform layer 3 forwarding for the packet.

If the MAC entry is searched out, but the destination MAC address of the packet is not the gateway MAC address of the gateway VXLAN switch, the packet may be forwarded according to a layer 2 packet forwarding method.

In an example of the present disclosure, the local MAC table of the I/O board may be learned by the I/O board according to a MAC entry learning method, or configured by the main board, or learned by the main board according to the MAC entry learning method and distributed to the I/O board.

Figure 2:
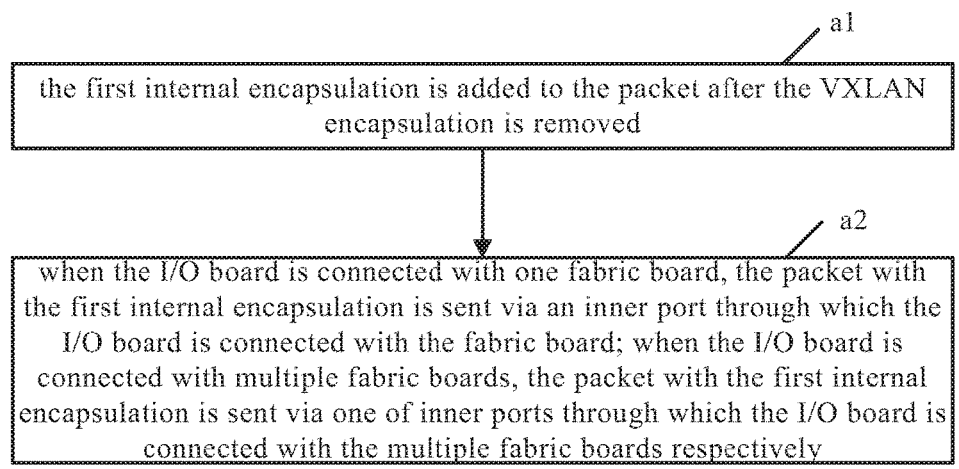
FIG. 2 is a flowchart illustrating a method for sending a packet to a fabric board of by an I/O board according to some examples of the present disclosure.

In an example of block 201, in order to ensure that the packet can be sent from the I/O board to the fabric board after the VXLAN encapsulation is removed, the I/O board may add internal encapsulation to the packet. For example, this internal encapsulation may be called first internal encapsulation. Accordingly, in an example of block 201, a method for sending the packet to the fabric board by the I/O board includes following blocks a1 and a2, referring to FIG. 2.

At block a1, the first internal encapsulation is added to the packet after the VXLAN encapsulation is removed.

The first internal encapsulation includes a first destination chip identity and a first destination port identity. The first destination chip identity is a first virtual chip identity, and the first destination port identity is a first virtual port identity.

In an example of the present disclosure, the first virtual chip identity may be a pre-configured virtual chip identity for indicating the fabric board to continue entry searching and packet forwarding. The first virtual port identity may be a pre-configured virtual port identity for indicating the fabric board to continue entry searching and packet forwarding. When the gateway VXLAN switch includes multiple fabric boards, all fabric boards are configured with the first virtual chip identity and the first virtual port identity.

At block a2, when the I/O board is connected with one fabric board, the packet with the first internal encapsulation is sent via an inner port through which the I/O board is connected with the fabric board; when the I/O board is connected with multiple fabric boards, the packet with the first internal encapsulation is sent via one of inner ports through which the I/O board is connected with the multiple fabric boards respectively.

When the I/O board is connected with multiple fabric boards, the inner ports through which the I/O board is connected with the multiple fabric boards respectively may be bundled in an inner port group. Accordingly, in an example of block a2, a process of sending the packet with the first internal encapsulation via one of inner ports through which the I/O board is connected with the multiple fabric boards respectively includes: selecting an inner port from the inner port group and sending the packet with the first internal encapsulation via the selected inner port. There are multiple methods for selecting an inner port from the inner port group, for example, selecting an inner port randomly, or selecting an inner port according to an algorithm such as a Hash algorithm.

According to blocks a1 and a2, the I/O board of the gateway VXLAN switch can send the packet to the fabric board of the gateway VXLAN switch after the VXLAN encapsulation is removed.

At block 202, the fabric board of the gateway VXLAN switch receives the packet sent by the I/O board, determines to perform layer 3 forwarding for the received packet, searches out a layer 3 entry matching a destination IP address of the packet from a local layer 3 table, modifies a source MAC address of the packet into the gateway MAC address of the gateway VXLAN switch, modifies the destination MAC address of the packet into a destination MAC address in the layer 3 entry, and when an egress port in the layer 3 entry is a VXLAN tunnel port, sends the modified packet to an I/O board associated with the egress port in the layer 3 entry on the gateway VXLAN switch.

In an example of the present disclosure, the I/O board associated with the egress port in the layer 3 entry is called a matched I/O board.

Based on the first internal encapsulation described at block 201, a process of determining to perform layer 3 forwarding for the received packet by the fabric board is implemented as follows.

The fabric board determines the first destination chip identity and the first destination port identity in a first internal encapsulation header of the received packet. If the first destination chip identity is the first virtual chip identity and the first destination port identity is the first virtual port identity, the fabric board removes the first internal encapsulation from the packet. If the destination MAC address of the packet is the gateway MAC address of the gateway VXLAN switch after the first internal encapsulation is removed, the fabric board determines to perform layer 3 forwarding for the received packet.

In an example of the present disclosure, when determining that the first destination chip identity is not the first virtual chip identity and/or the first destination port identity is not the first virtual port identity, the fabric board may not remove the first internal encapsulation from the packet, but forward the packet according to the first destination port identity in the first internal encapsulation.

In an example of block 202, the local layer 3 table of the fabric board may be configured by the main board, or learned by the main board according to a layer 3 entry learning method and distributed to the fabric board. In an example, the layer 3 entry may be a routing entry, and may include a destination IP address, a Virtual Local Area Network (VLAN) Identity (ID), a destination MAC address, a source MAC address, an egress port and so on. According to the contents included in the layer 3 entry, the layer 3 entry matching the destination IP address of the packet at block 202 is a layer 3 entry including the destination IP address of the packet.

In an example of the present disclosure, a VLAN port may be a single physical port, or a physical port group in which multiple physical ports are bundled. The single physical port and the physical port group in which multiple physical ports are bundled are called VLAN ports.

In an example of the present disclosure, the fabric board adds second internal encapsulation to the modified packet and sends the packet with the second internal encapsulation to the matched I/O board. Accordingly, the matched I/O board may send the packet with the second internal encapsulation to a VXLAN.

Figure 3:
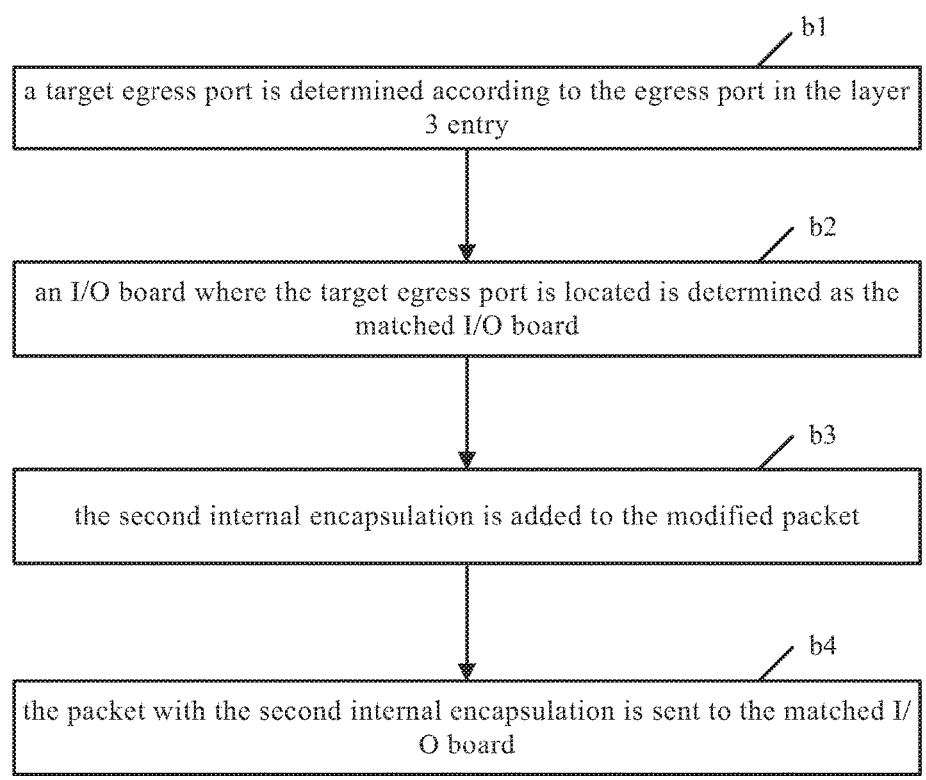
FIG. 3 is a flowchart illustrating a method for sending to a matched I/O board a packet modified by a fabric board according to some examples of the present disclosure.

Accordingly, in an example of block 202, a method for sending the modified packet to the matched I/O board includes following blocks, referring to FIG. 3.

At block b1, a target egress port is determined according to the egress port in the layer 3 entry.

In an example of the present disclosure, the target egress port may be determined according to the type of the egress port in the layer 3 entry. For example, the egress port in the layer 3 entry is a VLAN port. When the VLAN port is a single physical port, the target egress port is determined as the physical port. When the VLAN port is a physical port group in which multiple physical ports are bundled, the target egress port is determined as one physical port in the physical port group. The physical port may be selected from the physical port group. There are multiple methods for selecting one physical port from the physical port group, for example, selecting one physical port randomly, or selecting one physical port according to a selection algorithm such as a Hash algorithm.

At block b2, an I/O board where the target egress port is located determined as the matched I/O board.

In an example of the present disclosure, the matched I/O board may be determined according to the target egress port described at block b1.

At block b3, the second internal encapsulation is added to the modified packet.

The second internal encapsulation may include a second destination chip identity and a second destination port identity. The second destination chip identity is an identity of a chip for forwarding packets on the matched I/O board. If the matched I/O board has one chip, the second destination chip identity may be an identity of the chip. If the matched I/O board has multiple chips, one of the multiple chips may be assigned to forward packets in advance, and the second destination chip identity may be an identity of the assigned chip. The second destination port identity may be an identity of the target egress port described at block b1.

At block b4, the packet with the second internal encapsulation is sent to the matched I/O board.

According to blocks b1 to b4, the packet received from the fabric board by the matched I/O board is the packet with the second internal encapsulation.

At block 203, the matched I/O board in the gateway VXLAN switch receives the packet sent by the fabric board, and forwards the packet to a VLAN via the egress port in the layer 3 entry.

In an example of block 203, a process of forwarding the packet to the VLAN via the egress port in the layer 3 entry is implemented as follows.

The matched I/O board determines the second destination chip identity and the second destination port identity in a second internal encapsulation header of the packet. If the second destination chip identity is an identity of a chip for forwarding packets on the I/O board and the second destination port identity is an identity of a physical port connected with the I/O board, it is indicated that the packet is to be forwarded by the I/O board via the physical port, the matched I/O board removes the second internal encapsulation from the packet, and sends the packet to a VLAN via the physical port corresponding to the second destination port identity.

In an example of the present disclosure, the local encapsulation entries of the I/O hoard may be configured on the I/O board in advance.

In an example of the present disclosure, the fabric board of the gateway VXLAN switch uses a chip with a forwarding function and various entry functions, for example, a chip that is the same as that used by the I/O board. Accordingly, when the gateway VXLAN switch receives the packet with the VXLAN encapsulation via the I/O board, the VXLAN encapsulation is removed from the packet with the VXLAN encapsulation; when determining to perform layer 3 forwarding for the packet after removing the VXLAN encapsulation, the packet is sent to the fabric board of the gateway VXLAN switch. Afterwards, the layer 3 entry matching the destination IP address of the packet is searched out from the local layer 3 table of the fabric board. When the egress port in the layer 3 entry is a VXLAN tunnel port, the I/O board associated with the egress port in the layer 3 entry in the gateway VXLAN switch sends the modified packet to a VLAN. Accordingly, a layer 3 gateway function of VXLAN may be implemented via the gateway VXLAN switch, the packet may be forwarded from the VXLAN to the VLAN, and the whole process is performed inside the gateway VXLAN switch. Accordingly, any bandwidth resources are not wasted and the wire speed forwarding of the packet can be implemented.

The flowchart shown in FIG. 1 will be described according to an example.

Figure 4:
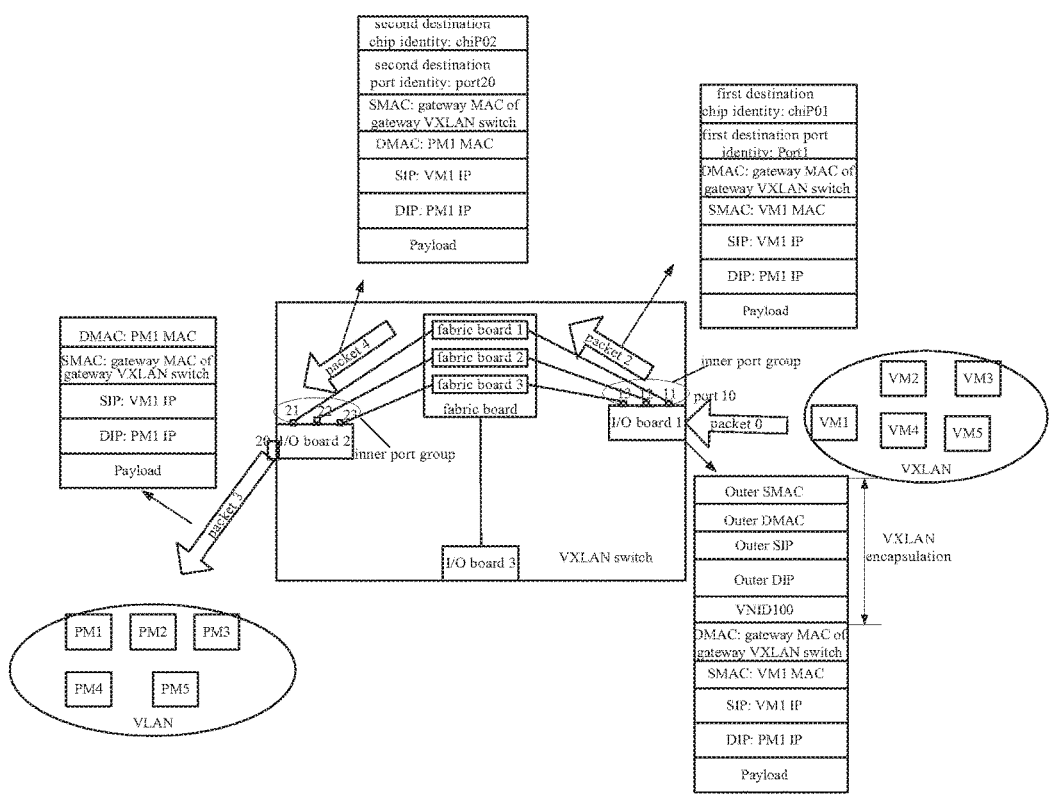
FIG. 4 is a diagram illustrating a networking structure for forwarding a packet from a VXLAN to a VLAN according to some examples of the present disclosure.

FIG. 4 is a diagram illustrating a networking structure for forwarding a packet from a VXLAN to a VLAN according to some examples of the present disclosure. As shown in FIG. 4, Physical Machine (PM)1 to PM5 are devices in a VLAN, and Virtual Machine (VM) 1 to VM5 are devices in a VXLAN. A gateway VXLAN switch is connected between the VLAN and the VXLAN, and includes a main board, an I/O board and a fabric board. The main board is not shown in FIG. 4. The fabric board uses a chip with a forwarding function and various entry functions. The chip used by the fabric board is the same as that used by the I/O board. FIG. 4 shows three I/O boards of the VXLAN switch.

A process of forwarding a packet from a VXLAN to a ULAN will be described, in which the VM1 visits the PM1.

The I/O board 1 of the gateway VXLAN switch receives a packet from the VM1 in the VXLAN via a local port (for example, port 10 in FIG. 4). Herein, the packet received by the I/O board is called packet 0. The packet 0 has VXLAN encapsulation corresponding to the VXLAN. The VXLAN encapsulation includes the VNID100 of the VXLAN and a VXLAN outer layer header corresponding to the VXLAN. The VXLAN outer layer header of the packet 0 shown in FIG. 4 includes outer ETH encapsulation. The outer ETH encapsulation includes an outer source MAC address, an outer destination MAC address, an outer source IP address and an outer destination IP address, FIG. 4 shows the structure of the packet with the VXLAN encapsulation.

The I/O board 1 obtains the VNID100 from the VXLAN encapsulation, and removes the VXLAN encapsulation from the packet 0. Herein, the packet 0 from which the VXLAN encapsulation has been removed is called packet 1.

The I/O board 1 searches a local MAC table for a MAC entry matching the destination MAC address of the packet 1 and the obtained. VNID100. If the MAC entry is searched out and the destination MAC address of the packet 1 is the gateway MAC address of the gateway VXLAN switch, the I/O board 1 determines to perform layer 3 forwarding for the packet 1.

The I/O board 1 adds first internal encapsulation to the packet 1. A first destination chip identity in the first internal encapsulation is a first virtual chip identity (for example, chip01 shown in FIG. 4), and a first destination port identity in the first internal encapsulation is a first virtual port identity (for example, port1 shown in FIG. 4). Herein, the packet 1 with the first internal encapsulation is called packet 2.

As shown in FIG. 4, the I/O board 1 is connected with each fabric board via an inner port group in which inner port 11, inner port 12 and inner port 13 are bundled. The I/O board 1 selects one inner port from the inner port group, for example, selects the inner port 11 shown in FIG. 4 to send the packet 2 to fabric board 1. A method for selecting an inner port by the I/O board 1 may be configured in advance. For example, the I/O board 1 may perform a Hash operation for the destination IP address of the packet 2 according to a Hash algorithm, and selects an inner port whose number corresponds to a Hash operation result.

The fabric board 1 receives the packet 2, determines that the first destination chip identity and the first destination port identity in the first internal encapsulation header of the packet 2 are chip01 and port1 respectively, which are the first virtual chip identity and the first virtual port identity respectively, and removes the first internal encapsulation from the packet 2. In this case, the packet 1 is restored.

The fabric board 1 identifies the destination MAC address of the packet 1, finds that the destination MAC address of the packet 1 is the gateway MAC address of the gateway VXLAN switch, and determines to perform layer 3 forwarding for the packet 1.

The fabric board 1 searches out a layer 3 entry matching the destination IP address of the packet 1 from a local layer 3 table, and finds that an egress port in the searched-out layer 3 entry is a ULAN port. The fabric board 1 modifies the source MAC address of the packet 1 into the gateway MAC address of the gateway VXLAN switch, and modifies the destination MAC address of the packet 1 into a destination MAC address in the searched-out layer 3 entry. In FIG. 4, the destination MAC address in the searched-out layer 3 entry may be the MAC address of the PM1. Herein, the packet 1 whose source MAC address and destination MAC address have been modified is called packet 3.

The fabric board 1 finds that the egress port in the searched-out layer 3 entry is a physical port group in which multiple physical ports are bundled, and selects an I/O board where a physical port in the physical port group is located as a matched hoard. When the egress port in the searched-out layer 3 entry is a single physical port, the fabric board 1 selects an I/O board where the single physical port is located as the matched I/O board. Herein, it is supposed that the I/O board where the single physical port is located is I/O board 2.

The fabric board 1 adds second internal encapsulation to the packet 3. Herein, the packet 3 with the second internal encapsulation is called packet 4. The second internal encapsulation includes a second destination chip identity and a second destination port identity. The second destination chip identity is an identity of a chip for forwarding packets on the I/O board 2. In FIG. 4, the identity of the chip is chip02. The second destination port identity is a target egress port. In FIG. 4, the target egress port is port20.

The fabric board 1 sends the packet 4 to the I/O board 2 via an inner port through which the fabric board 1 is connected with the I/O board 2.

The I/O board 2 receives the packet 4 sent by the fabric board 1, and determines the second destination chip identity and the second destination port identity in a second internal encapsulation header of the packet 4. If the second destination chip identity is the identity of the chip (for example, chip02) for forwarding packets on the I/O board 2 and the second destination port identity is an identity of a physical port (for example, port20) connected with the I/O board 2, the I/O) board 2 removes the second internal encapsulation from the packet 4. In this case, the packet 3 is restored.

The I/O board 2 sends the packet 3 via an egress port corresponding to the second destination port identity (for example, port20).

The PM1 can receive the packet sent by the VM1 in the VXLAN. Accordingly, the packet can be forwarded from the VXLAN to the VLAN via the gateway VXLAN switch.

An apparatus for forwarding a packet from a VXLAN to a VLAN will be described hereinafter with reference to some examples.

Figure 5:
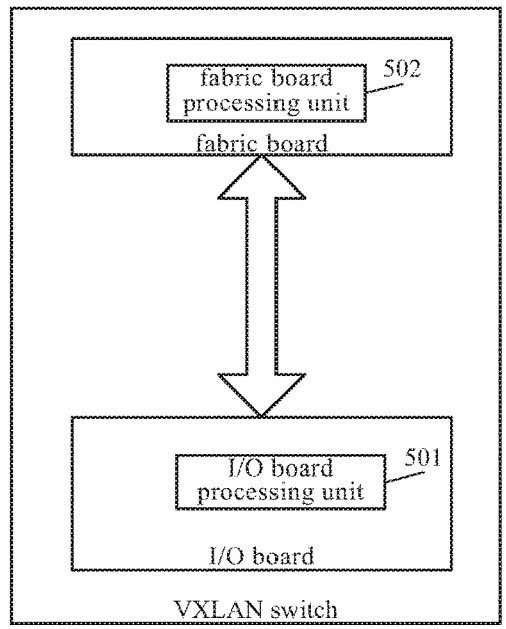
FIG. 5 is a diagram illustrating a structure of an apparatus for forwarding a packet from a VXLAN to a VLAN according to some examples of the present disclosure.

FIG. 5 is a diagram illustrating a structure of an apparatus for forwarding a packet from a VXLAN to a VLAN according to some examples of the present disclosure. The apparatus may be a VXLAN switch used as a gateway. The VXLAN switch includes an I/O board and a fabric board. Both the number of I/O boards and the number of fabric boards are larger than or equal to 1. The fabric board uses a chip with a forwarding function and various entry functions. As shown in FIG. 5, the VXLAN switch further includes an I/O board processing unit 501 and a fabric board processing unit 502.

The I/O board processing unit 501 is located on an I/O board of the VXLAN switch, and may receive a packet with first VXLAN encapsulation, remove the first VXLAN encapsulation from the packet with the first VXLAN encapsulation, determine to perform layer 3 forwarding for the packet, and send the packet to a fabric board of the VXLAN switch; receive a packet sent by the fabric board, and forward the packet to a VLAN via an egress port in a layer 3 entry searched out by the fabric board.

The fabric processing unit 502 is located on the fabric board of the VXLAN switch, and may receive the packet sent by the I/O board, determine to perform layer 3 forwarding for the received packet, search out the layer 3 entry matching a destination IP address of the packet from a local layer 3 table, modify a source MAC address of the packet into a gateway MAC address of the VXLAN switch, modify a destination MAC address of the packet into a destination MAC address in the layer 3 entry, and when the egress port in the layer 3 entry is a VLAN port, send the modified packet to an I/O board associated with the egress port in the layer 3 entry in the VXLAN switch.

In an example, before removing the first VXLAN encapsulation from the packet with the first VXLAN encapsulation, the I/O board processing unit 501 may identify a VNID from a VXLAN encapsulation header of the packet.

The I/O board processing unit 501 may determine to perform layer 3 forwarding for the packet through following processes. The I/O board processing unit 501 searches a local MAC table for a MAC entry matching the VNID and the destination MAC address of the packet. If the MAC entry is searched out and the destination MAC address of the packet is the gateway MAC address of the VXLAN switch, the I/O board processing unit 501 determines to perform layer 3 forwarding for the packet.

In an example, the I/O board processing unit 501 may send the packet to the fabric board of the VXLAN switch through following processes.

The I/O board processing unit 501 adds first internal encapsulation to the packet after the first VXLAN encapsulation is removed. The first internal encapsulation includes a first destination chip identity and a first destination port identity. The first destination chip identity is a first virtual chip identity, and the first destination port identity is a first virtual port identity.

In an example, when the I/O board is connected with one fabric board, the I/O board processing unit 501 sends the packet with the first internal encapsulation via an inner port through which the I/O board is connected with the fabric board. When the I/O board is connected with multiple fabric boards, the I/O board processing unit 501 sends the packet with the first internal encapsulation via one of inner ports through which the I/O board is connected with the multiple fabric boards respectively.

In an example, the fabric board processing unit 502 may determine to perform layer 3 forwarding for the received packet with the first internal encapsulation through following processes.

The fabric board processing unit 502 determines the first destination chip identity and the first destination port identity in a first internal encapsulation header of the received packet with the first internal encapsulation. If the first destination chip identity is the first virtual chip identity and the first destination port identity is the first virtual port identity, the fabric board processing unit 502 removes the first internal encapsulation from the packet with the first internal encapsulation. When determining that the destination MAC address of the packet is the gateway MAC address of the VXLAN switch after the first internal encapsulation is removed, the fabric board processing unit 502 determines to perform layer 3 forwarding for the packet.

In an example, the fabric board processing unit 502 may send the packet modified by the fabric board to the I/O board associated with the egress port in the layer 3 entry in the VXLAN switch through following processes. The fabric board processing unit 502 determines a target egress port according to the egress port in the layer 3 entry, determines an I/O board where the target egress port is located as the I/O board associated with the egress port in the layer 3 entry, adds second internal encapsulation to the modified packet, and send the packet with the second internal encapsulation to the I/O board associated with the egress port in the layer 3 entry. The second internal encapsulation may include a second destination chip identity and a second destination port identity. The second destination chip identity is an identity of a chip for forwarding packets on the I/O board associated with the egress port in the layer 3 entry. The second destination port identity is an identity of the target egress port.

In an example, the I/O board processing unit 501 may forward the packet to the ULAN via the egress port in the searched-out layer 3 entry through following processes. The I/O board processing unit 501 determines the second destination chip identity and the second destination port identity in a second internal encapsulation header of the packet. If the second destination chip identity is an identity of a chip for forwarding packets on the I/O board associated with the egress port in the layer 3 entry and the second destination port identity is an identity of a physical port connected with the I/O board associated with the egress port in the layer 3 entry, the I/O board processing unit 501 removes the second internal encapsulation from the packet, and sends the packet to the VLAN via the physical port corresponding to the second destination port identity.

The fabric board processing unit 502 may determine the target egress port according to the egress port in the layer 3 entry through following processes. When the egress port in the layer 3 entry is a single physical port, the fabric board processing unit 502 determines the physical port as the target egress port. When the egress port in the layer 3 entry is a physical port group in which multiple physical ports are bundled, the fabric board processing unit 502 determines one physical port in the physical port group as the target egress port.

Figure 6:
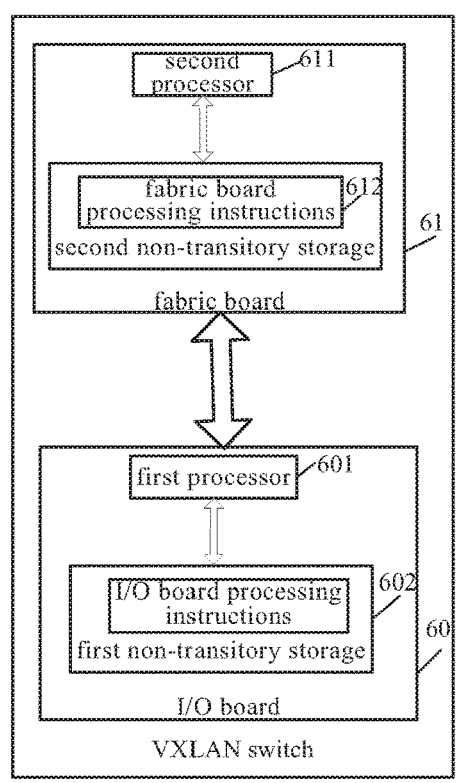
FIG. 6 is a diagram illustrating a hardware structure of an apparatus for forwarding a packet from a VXLAN to a VLAN according to some examples of the present disclosure.

A hardware structure of the apparatus for forwarding a packet from a VXLAN to a VLAN is also provided according to some examples of the present disclosure. The apparatus is a VXLAN switch used as a gateway. As shown in FIG. 6, the hardware structure of the VXLAN switch may include an I/O board 60 and a fabric board 61.

The I/O board 60 may include a first processor 601 (for example, a CPU) and a first non-transitory storage 602.

The first non-transitory storage 602 may store machine-readable instructions, which include I/O board processing instructions that can be executed by the first processor 601.

The first processor 601 may read and execute the I/O board processing instructions stored in the first non-transitory storage 602 to implement the functions of the I/O board processing unit shown in FIG. 5.

The fabric board 61 may include a second processor 611 (for example, a CPU) and a second non-transitory storage 612.

The second non-transitory storage 612 may store machine-readable instructions, which include fabric board processing instructions that can be executed by the second processor 611.

The second processor 611 may read and execute the fabric board processing instructions stored in the second non-transitory storage 612 to implement the functions of the fabric board processing unit shown in FIG. 5.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A packet forwarding method, comprising:
receiving, by an Input/Output (I/O) board of a Virtual eXtensible Local Area Network (VXLAN) switch, a packet with VXLAN encapsulation, removing the VXLAN encapsulation from the packet with the VXLAN encapsulation, determining to perform layer 3 forwarding for the packet, and sending the packet to a fabric board of the VXLAN switch;
receiving, by the fabric board of the VXLAN switch, the packet sent by the I/O board, determining to perform layer 3 forwarding for the received packet, searching out a layer 3 entry matching a destination Internet Protocol (IP) address of the packet from a local layer 3 table, modifying a source Media Access Control (MAC) address of the packet into a gateway MAC address of the VXLAN switch, modifying a destination MAC address of the packet into a destination MAC address in the layer 3 entry, and when an egress port in the layer 3 entry is a VLAN port, sending the modified packet to an I/O board associated with the egress port in the layer 3 entry in the VXLAN switch; and
receiving, by the I/O board associated with the egress port in the layer 3 entry in the VXLAN switch, the packet sent by the fabric board, and forwarding the packet to a VLAN via the egress port in the layer 3 entry,
wherein, the sending the modified packet to the I/O board associated with the egress port in the layer 3 entry in the VXLAN switch comprises:
determining a target egress port according to the egress port in the layer 3 entry, determining an I/O board where the target egress port is located as the I/O board associated with the egress port in the layer 3 entry, adding second internal encapsulation to the modified packet, and sending the packet with the second internal encapsulation to the I/O board associated with the egress port in the layer 3 entry, wherein the second internal encapsulation includes a second destination chip identity and a second destination port identity, the second destination chip identity is an identity of a chip for forwarding packets on the I/O board associated with the egress port in the layer 3 entry, and the second destination port identity is an identity of the target egress port; and the forwarding the packet to the VLAN via the egress port in the layer 3 entry comprises:

determining the second destination chip identity and the second destination port identity in a second internal encapsulation header of the packet; when the second destination chip identity is an identity of a chip for forwarding packets on the I/O board associated with the egress port in the layer 3 entry and the second destination port identity is an identity of a physical port connected with the I/O board associated with the egress port in the layer 3 entry, removing the second internal encapsulation from the packet, and sending the packet to the VLAN via the physical port corresponding to the second destination port identity.

2. The method of claim 1, before the I/O board of the VXLAN switch removes the VXLAN encapsulation from the packet with the VXLAN encapsulation, further comprising: identifying a Virtual Network ID (VNID) from a VXLAN encapsulation header of the packet, wherein the determining, by the I/O board of the VXLAN switch, to perform layer 3 forwarding for the packet after removing the VXLAN encapsulation comprises: searching a local MAC table for a MAC entry matching the VNID and the destination MAC address of the packet after the VXLAN encapsulation is removed; when the MAC entry is searched out and the destination MAC address of the packet is the gateway MAC address of the VXLAN switch, determining to perform layer 3 forwarding for the packet after the VXLAN encapsulation is removed.

3. The method of claim 1, wherein the sending the packet to the fabric board of the VXLAN switch comprises:

adding first internal encapsulation to the packet, wherein the first internal encapsulation comprises a first destination chip identity and a first destination port identity, the first destination chip identity is a first virtual chip identity, and the first destination port identity is a first virtual port identity;

when the I/O board is connected with one fabric board, sending the packet with the first internal encapsulation via an inner port through which the I/O board is connected with the fabric board; when the I/O board is connected with multiple fabric boards, sending the packet with the first internal encapsulation via one of an inner port through which the I/O board is connected with the multiple fabric boards respectively;

the determining, by the fabric board, to perform layer 3 forwarding for the received packet comprises:

determining the first destination chip identity and the first destination port identity in a first internal encapsulation header of the received packet; when the first destination chip identity is the first virtual chip identity and the first destination port identity is the first virtual port identity, removing the first internal encapsulation from the packet with the first internal encapsulation; when determining that the destination MAC address of the packet is the gateway MAC address of the VXLAN switch, determining to perform layer 3 forwarding for the packet.

4. The method of claim 1, wherein the determining the target egress port according to the egress port in the layer 3 entry comprises:

when the egress port in the layer 3 entry is a single physical port, determining the physical port as the target egress port; when the egress port in the layer 3 entry is a physical port group in which multiple physical ports are bundled, determining one physical port in the physical port group as the target egress port.

5. A Virtual eXtensible Local Area Network (VXLAN) switch, comprising:

an Input/Ouput (I/O) board processing unit, located on an I/O board of the VXLAN switch, and to receive a packet with a first VXLAN encapsulation, remove the first VXLAN encapsulation from the packet with the first VXLAN encapsulation, determine to perform layer 3 forwarding for the packet, and send the packet to a fabric board of the VXLAN switch; receive a packet sent by the fabric board, and forward the packet to a Virtual Local Area Network (VLAN) via an egress port in a layer 3 entry searched out by the fabric board; and a fabric processing unit, located on the fabric board of the VXLAN switch, and to receive the packet sent by the I/O board, determine to perform layer 3 forwarding for the received packet, search out the layer 3 entry matching a destination Internet Protocol (IP) address of the packet from a local layer 3 table, modify a source Media Access Control (MAC) address of the packet into a gateway MAC address of the VXLAN switch, modify a destination MAC address of the packet into a destination MAC address in the layer 3 entry, and when the egress port in the layer 3 entry is a VLAN port, send the modified packet to an I/O board associated with the egress port in the layer 3 entry in the VXLAN switch, wherein, the fabric board processing unit is to send the packet modified by the fabric board to the I/O board associated with the egress port in the layer 3 entry in the VXLAN switch through a process of:

determining a target egress port according to the egress port in the layer 3 entry, determining an I/O board where the target egress port is located as the I/O board associated with the egress port in the layer 3 entry, adding a second internal encapsulation to the modified packet, and sending the packet with the second internal encapsulation to the I/O board associated with the egress port in the layer 3 entry, wherein the second internal encapsulation includes a second destination chip identity and a second destination port identity, the second destination chip identity is an identity of a chip for forwarding packets on the I/O board associated with the egress port in the layer 3 entry, and the second destination port identity is an identity of the target egress port; and the I/O board processing unit is to forward the packet to the VLAN via the egress port in a searched-out layer 3 entry through a process of:

determining the second destination chip identity and the second destination port identity in a second internal encapsulation header of the packet; when the second destination chip identity is an identity of a chip for forwarding packets on the I/O board associated with the egress port in the layer 3 entry and the second destination port identity is an identity of a physical port connected with the I/O board associated with the egress port in the layer 3 entry, removing the second internal encapsulation from the packet, and sending the packet to the VLAN via the physical port corresponding to the second destination port identity.

6. The VXLAN switch of claim 5, wherein, before removing the first VXLAN encapsulation from the packet with the first VXLAN encapsulation, the I/O board processing unit is further to identify a Virtual Network ID (VNID) from a VXLAN encapsulation header of the packet;
the I/O board processing unit is to determine to perform layer 3 forwarding for the packet through a process of:
searching a local MAC table for a MAC entry matching the VNID and the destination MAC address of the packet, and when the MAC entry is searched out and the destination MAC address of the packet is the gateway MAC address of the VXLAN switch, determining to perform layer 3 forwarding for the packet.

7. The VXLAN switch of claim 5, wherein the I/O board processing unit is to send the packet to the fabric board of the VXLAN switch through a process of:
adding a first internal encapsulation to the packet after the first VXLAN encapsulation is removed, wherein the first internal encapsulation includes a first destination chip identity and a first destination port identity, the first destination chip identity is a first virtual chip identity, and the first destination port identity is a first virtual port identity;
when the I/O board is connected with one fabric board, sending the packet with the first internal encapsulation via an inner port through which the I/O board is connected with the fabric board; when the I/O board is connected with multiple fabric boards, sending the packet with the first internal encapsulation via one of inner ports through which the I/O board is connected with the multiple fabric boards respectively; and the fabric board processing unit is to determine to perform layer 3 forwarding for the received packet with the first internal encapsulation through a process of:
determining the first destination chip identity and the first destination port identity in a first internal encapsulation header of the received packet with the first internal encapsulation; when the first destination chip identity is the first virtual chip identity and the first destination port identity is the first virtual port identity, removing the first internal encapsulation from the packet with the first internal encapsulation; when determining that the destination MAC address of the packet is the gateway MAC address of the VXLAN switch after the first internal encapsulation is removed, determining to perform layer 3 forwarding for the packet.

8. The VXLAN switch of claim 5, wherein the fabric board processing unit may determine the target egress port according to the egress port in the layer 3 entry through a process of:
when the egress port in the layer 3 entry is a single physical port, determining the physical port as the target egress port; when the egress port in the layer 3 entry is a physical port group in which multiple physical ports are bundled, determining one physical port in the physical port group as the target egress port.

* * * * *